US007152802B2

(12) United States Patent
Kell et al.

(10) Patent No.: US 7,152,802 B2
(45) Date of Patent: Dec. 26, 2006

(54) STORING AND ACCESSING KEYS

(75) Inventors: Curtis Kell, Burlington, WI (US); Timothy Gill, San Pedro, CA (US); Steven Probert, San Pedro, CA (US); Arthur Mariduena, Lakewood, CA (US)

(73) Assignee: Key Control Holding, Inc., Houston, TX (US)

( * ) Notice: Subject to any disclaimer, the term of this patent is extended or adjusted under 35 U.S.C. 154(b) by 209 days.

(21) Appl. No.: 10/864,558

(22) Filed: Jun. 8, 2004

(65) Prior Publication Data

US 2005/0269414 A1 Dec. 8, 2005

(51) Int. Cl.
*G06K 19/06* (2006.01)

(52) U.S. Cl. .................................................... 235/492

(58) Field of Classification Search ................. 235/492
See application file for complete search history.

(56) References Cited

U.S. PATENT DOCUMENTS 5,388,439 A * 2/1995 Miller ...................... 70/456 R
5,614,885 A * 3/1997 Van Lente et al. .......... 340/525
6,016,676 A * 1/2000 McConnell .................. 70/408
6,236,333 B1 * 5/2001 King ......................... 340/5.61
6,434,510 B1 * 8/2002 Callaghan ................... 702/165
2005/0215286 A1 * 9/2005 Brass et al. ................. 455/557

FOREIGN PATENT DOCUMENTS

WO 2003063517 * 1/2003

* cited by examiner

*Primary Examiner*—Daniel Stcyr
(74) *Attorney, Agent, or Firm*—Jackson Walker L.L.P.; Mark A. Tidwell, Esq.

(57) ABSTRACT

There is disclosed a key access fob, key access devices, a key access system, key access methods. A fob may comprise a receiver, a transmitter, and a light pipe running from a bottom end of the fob to a top end of the fob. A docking unit may comprise a plurality of receivers configured to receive a fob. Each receiver may include three openings. The docking unit may also comprise a plurality of receiving units, one receiving unit for each of the receivers, each receiving unit including a transmitter, a receiver, and a light emitting diode (LED). A key access system may include one or more docking units in one or more drawers in one or more cabinets, the cabinets coupled to a computing device running an application program. The application program in conjunction with other devices may execute key access methods.

38 Claims, 15 Drawing Sheets

STORING AND ACCESSING KEYS

RELATED APPLICATION INFORMATION

This patent is related to U.S. Design patent entitled KEY FOB having U.S. Pat. No. D522,235, issued Jun. 6, 2006.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The present invention relates to storing and accessing keys.

2. Description of the Related Art

Keys are used in a variety of circumstances. Keys are used to gain access to homes, apartments, condominiums, office buildings, storage sheds, barns, warehouses, hotel rooms, schools and school rooms, and other structures. Keys are used to gain access to and to start the engines of cars, motorcycles, trucks, recreational vehicles, boats, heavy machinery, tractors and other equipment and vehicles. Keys may be used by potential or actual renters, purchasers, users, owners, maintenance persons, and others to access and use these vehicles and structures.

When multiple persons regularly need term access to the structures or vehicles described in the prior paragraph, keys may be stored in and accessed from a well known location. Keys may be stored on key rings and placed on hooks on a board, in a notebook, and in drawers. The keys may be paired with tags or cards to identify the keys. A person may check out keys from an attendant, supervisor, manager, security guard, or other person. In addition, automated and/or computer controlled key drawers may be used to store keys and provide secure access to the keys.

SUMMARY OF THE INVENTION

The present invention provides a key fob and key access system and method. The key access fob is preferably an elongated housing provided with a receiver, a transmitter and a light pipe running from one end of the housing to the other end of the housing in order to transmit an externally generated light therethrough, thereby enhancing visual identification of the key fob when a light is projected through the light pipe. The key fob mounts in a receiver disposed in a docking unit. The receiver includes at least one opening to permit light generated below the receiver to be passed through the opening and into the light pipe. The key fob preferably includes two additional openings, one for a transmitter signal and one for a receiver signal to pass therethrough to corresponding openings in the key fob. Mounted under or below the receiver is a board on which is mounted a receiving unit or individual circuit board, which receiving unit carries a light source, such as an LED, an infrared transmitter and an infrared receiver that are correspondingly aligned with the openings in the receiver. The receiving unit may also include a magnetic sensor and a processor. Each receiver is preferably provided with its own separate receiving unit. In operation, the light source below the receiver can be operated to project light through said opening and into said light pipe, thereby drawing attention to the key fob when it is mounted in the docking unit.

DETAILED DESCRIPTION

Throughout this description, the embodiments and examples shown should be considered as exemplars, rather than limitations on the apparatus and methods of the present invention.

A System

Figure 1:
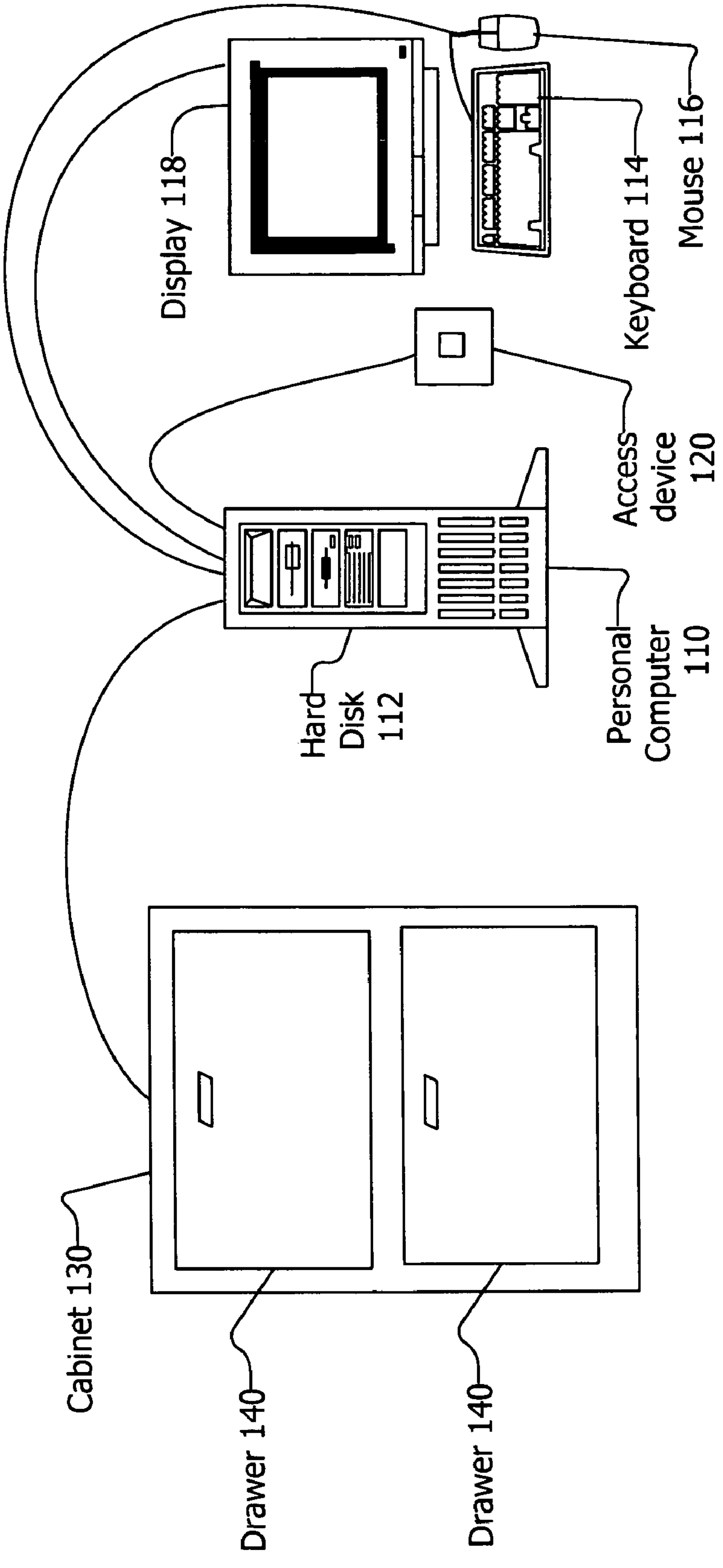
FIG. 1 is a block diagram of a key access system described herein.

FIG. 1 is a block diagram of a key access system that includes a personal computer 110, an access device 120 and a cabinet 130. Keys may be attached to or otherwise coupled with fobs and stored in drawers 140 of cabinet 130. As used herein, a fob is a device that is capable of having one or more keys attached thereto, and is capable of communicating with a key access system through a drawer in a cabinet coupled to a personal computer or other computing device. One embodiment of a fob is described below regarding FIGS. 4A–4D.

The cabinet 130 and drawers 140 may be made from any sufficiently strong, durable material, such as for example, metals, woods, pressed board, and the like, and combinations of these. Although one cabinet 130 is shown, the key access system may have two or more cabinets. Although two drawers 140 are shown, the cabinet 130 may have only one drawer, and may have three or more drawers. When there are multiple drawers 140 in the cabinet 130, the drawers 140 may be arranged horizontally and/or vertically. The size and dimensions of the cabinet should be sufficient to accommodate the drawers 140. The drawers have length and width of any convenient size, including, for example, 24"×24", 18"×30", and others. The height of the drawers may be sufficient to accommodate docking units described below. The height of the drawers may be for example, 6", 7", 8", 9", 10" and others.

The cabinet 130 and drawers 140 may include a lock or locking system that may be physically controlled by a user, and/or electronically controlled by a personal computer, such as for example, personal computer 110, or other computing device described below. The contents of the drawers 140 are described in more detail below with regard to FIGS. 2, 3A–3D. The fobs are described in more detail below with regard to FIGS. 4A–4D.

Personal computer 110 may include a hard disk 112 or other storage device, and may have user input devices such as, for example, keyboard 114 and mouse 116 coupled thereto. Other user input devices such as, for example, track balls and others may be included in addition to and in place of the keyboard 114 and mouse 116.

Although the system shown includes personal computer 110, the system may be implemented with any computing device. A computing device as used herein refers to any device with a processor capable of executing instructions, memory and a storage device. A computing device may be, for example, a personal computer, a server computer, a computing tablet, a personal digital assistant (PDA), a portable computer, and a laptop computer. These computing devices may run any operating system, including, for example, variations of the Linux, Unix, MS-DOS, Microsoft Windows, Palm OS, and Apple Mac OS operating systems.

Although shown as a hard disk 112, the personal computer may include other storage devices in addition to or in place of hard disk 112. As used herein, a storage device is a device that allows for the reading from and/or writing to a machine readable medium. A storage device may include or be a machine readable medium. A machine readable medium is a medium that includes code, data, instructions or other information which can be read by and/or executed by a processor. A machine readable medium includes, for example, magnetic media (e.g., hard disks, tape, floppy disks), optical media (e.g., CD, DVD), flash memory products (e.g., memory stick, compact flash and others), and volatile and non-volatile silicon memory products (e.g., flash memory, random access memory (RAM), programmable read-only memory (PROM), electronically erasable programmable read-only memory (EEPROM), and others). Example storage devices include hard disk drives, digital versatile disk drives (DVD), flash memory devices, and others.

A portion of the key access system may be implemented as application program software and stored on hard disk 112 and/or other storage device included in or coupled with personal computer 110. The application software may manage and provide access to information concerning multiple fobs, keys attached to the fobs, whether the fobs are stored in the cabinet 130, whether the fobs and attached keys are checked out, to whom fob and attached keys are checked out, persons allowed to access particular keys, security levels of keys and persons, and/or other information. The application software may include, maintain or access a local database to store, update and otherwise access this information. A remote database may be used in addition to or in place of the local database. In this embodiment, the personal computer includes a network interface card (NIC) or other device that allows the personal computer 110 to access a remote database over a network. Such a network may be a local area network (LAN), wide area network (WAN), the Internet, a public network, a private network, or other network. The network may be wired, wireless, or a combination thereof.

The access device 120 may be used in conjunction with personal computer 110 to provide secure access to the keys within cabinet 130. Although only one access device is shown, two or more access devices 120 may be coupled with personal computer 110. The access device 120 may be a biometric device such as a retinal scanner, voice print, or a thumb or finger print reader. The access device 120 may be a camera or other device that performs facial recognition. The access device 120 may also be a device that receives a fob. A fob receiving access device is described below regarding FIGS. 5A and 5B. The access device 120 may also be a driver's license reader, smart card reader, identity card reader, or other card reader or scanner.

In addition to or in place of providing secure access to authorized users via access device 120, a person wishing to access the cabinet 130 may be required to provide a password via the application software executed on personal computer 110 to gain access to the cabinet 130.

Figure 2:
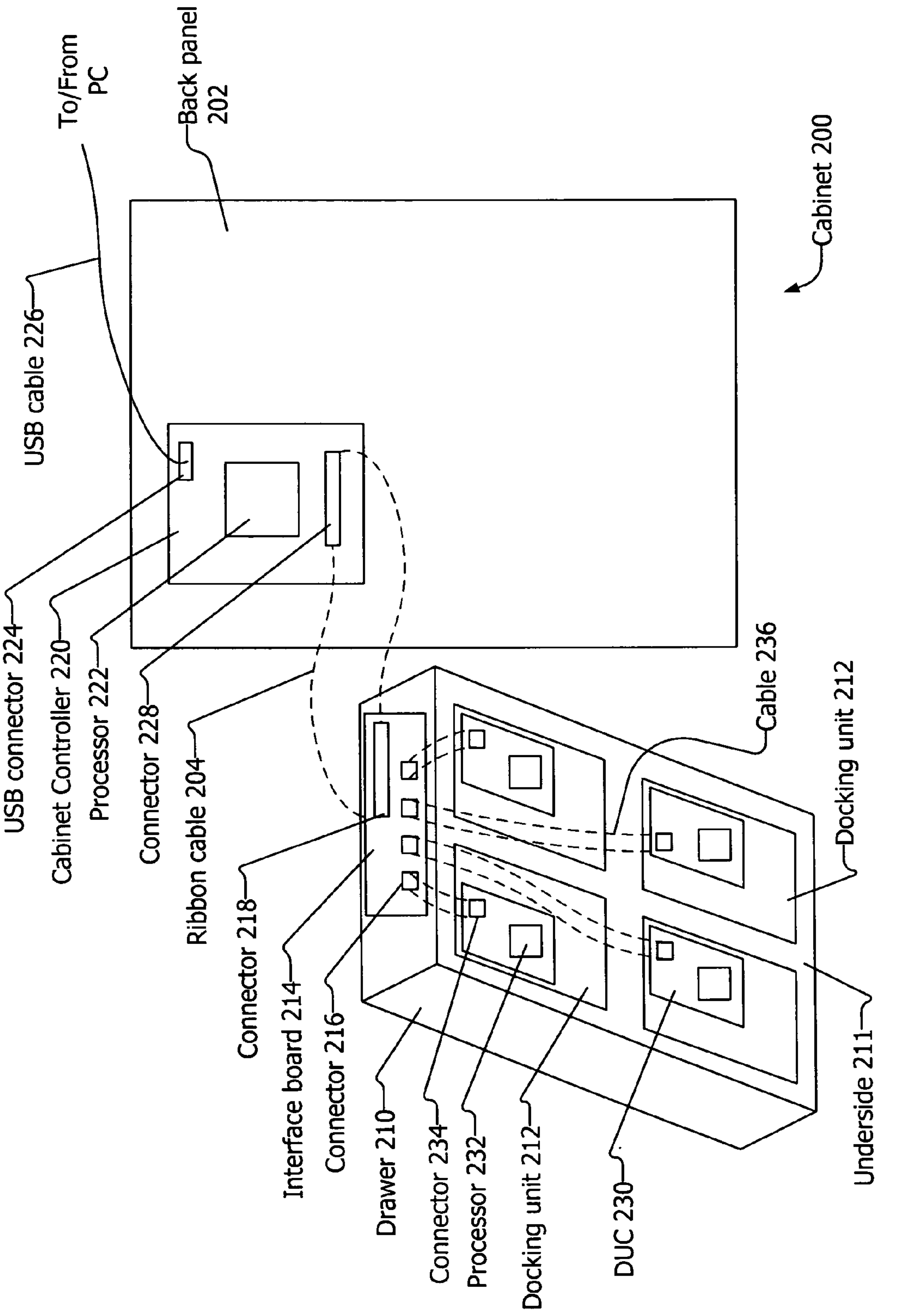
FIG. 2 is a block diagram of components included in a cabinet included in a key access system described herein.

FIG. 2 is a block diagram of components included in cabinet 200 included in a key access system. FIG. 2 only shows those limited portions of cabinet 200 and drawer 210 that show components discussed. Well known components such as side panels, sliders, and other cabinet and drawer hardware are not depicted. The cabinet 200 may be a cabinet like cabinet 130 and the drawer 210 may be a drawer like drawers 140 shown in FIG. 1. FIG. 2 shows a back panel 202 of cabinet 200 and a drawer 210 that may be included in cabinet 210. The drawer 210 is shown so that its underside 211 is viewable.

The cabinet 200 may have a back panel 202 to which a cabinet controller 220 is coupled. The cabinet controller 220 may include a processor 222. The processor 222 may include a storage device such as a one time programmable (OTP) EEPROM to store instructions which are to be executed. The processor 222 may provide support for communications with a personal computer such as personal computer 110 shown in FIG. 1. The communications between the cabinet controller 220 and the personal computer may be via a wired connection or a wireless connection, and may be achieved according to a proprietary scheme or a communications standard, such as, for example, Universal Serial Bus (USB), IEEE 1394 (also known as Firewire and i.link), Ethernet, IEEE 802.11 (also known as Wi-Fi), ZigBee, Bluetooth, and others. A chip or chipset may augment the processor 222 to provide support for one or more wired and/or wireless communications standards.

The cabinet controller 220 may include a USB connector 224 by which the cabinet 200 may be coupled for communication over a USB cable 226 with a personal computer.

The cabinet controller 220 may communicate with one or more docking units 212 in drawers 210 via wired and/or wireless connections. The cabinet controller 220 may communicate with the docking units 212 in the drawers 210 via an interface board 214 included in the drawers 210. The cabinet controller 220 may include a connector 228 by which the cabinet controller 220 communicates over a ribbon cable 204 with one or more docking units 212 included in each drawer 210 via the interface board 214 included with each drawer 210. The ribbon cable 204 and connectors 218 and 228 may be obtained from the AMP Products division of Tyco Electronics. The processor 222 in cabinet controller 220 may provide support for or be augmented with a chip or chip set that provides support for communication with the one or more docking units 212 in the drawers 210. The communications between the cabinet controller 220 and the docking units 212 through interface board 214 may be via one of the communications standards described above, may be proprietary, and may be via a universal asynchronous receiver transmitter (UART) serial link. When the communications between the cabinet controller 220 and the drawer 210 are via the UART standard, the ribbon cable 204 and connectors 218 and 228 14 pin/channel and may be obtained from the AMP Products division of Tyco Electronics.

The interface board 214 of each of the drawers 210 may be coupled with the cabinet controller 220 on the back panel 202 of the cabinet 200 via a ribbon cable 204. In this way, when the drawers are slid in and out, the cable will, slide, flop, fold and unfold to allow for extension of the drawer 210 from the cabinet 200 while, at the same time, allowing for the physical connection via ribbon cable 204 between the interface board 214 and the cabinet controller 220 to be maintained.

Each drawer 210 may include one or more docking units 212. Each drawer 210 may include one or more receptacles (not shown), each receptacle to receive a docking unit 212. The receptacles may be formed by one or more metal, plastic or other dividers. All the receptacles in a drawer need not be occupied by a docking unit for the drawer 210 and the docking units 212 included therein to function. Each docking unit 212 may include receivers to accommodate multiple fobs. The docking units 212 are discussed below with regard to FIGS. 3A, 3B, and 3D. In one embodiment, each drawer 210 includes 10 docking units, and each docking unit includes 24 receivers. In another embodiment, each drawer 210 includes 5 docking units, and each docking unit includes 48 receivers. This is described in more detail below with regard to FIGS. 3A, 3B, and 3D.

Each docking unit 212 includes a docking unit controller (DUC) 230. Each DUC includes a connector 234 by which the DUC 230 is coupled via cable 236 with interface board 214. Interface board 214 includes at least one connector 216 for coupling with each docking unit 212. The DUC 230 may communicate with the cabinet controller 220 via interface board 214. The communications between the DUC 230 and the interface board 214 may be according to the same communications standard or scheme as between the interface board 214 and the cabinet controller 220. In one embodiment, the communications between the DUC 230 and the interface board 214 are according to the UART standard. The connectors 216 and 234 may be of a proprietary or standard configuration. For example, the connectors 216 and 234 may be RJ12 connectors. When a wired connection exists between interface board 214 and each of the DUCs 230, the interface board 214 has at least as many connectors 216 as there are DUCs 230. In another embodiment, the DUCs 230 may be wirelessly connected with the interface board 214 according any of the wireless communications standards described above or using proprietary wireless communications.

Figure 3A:
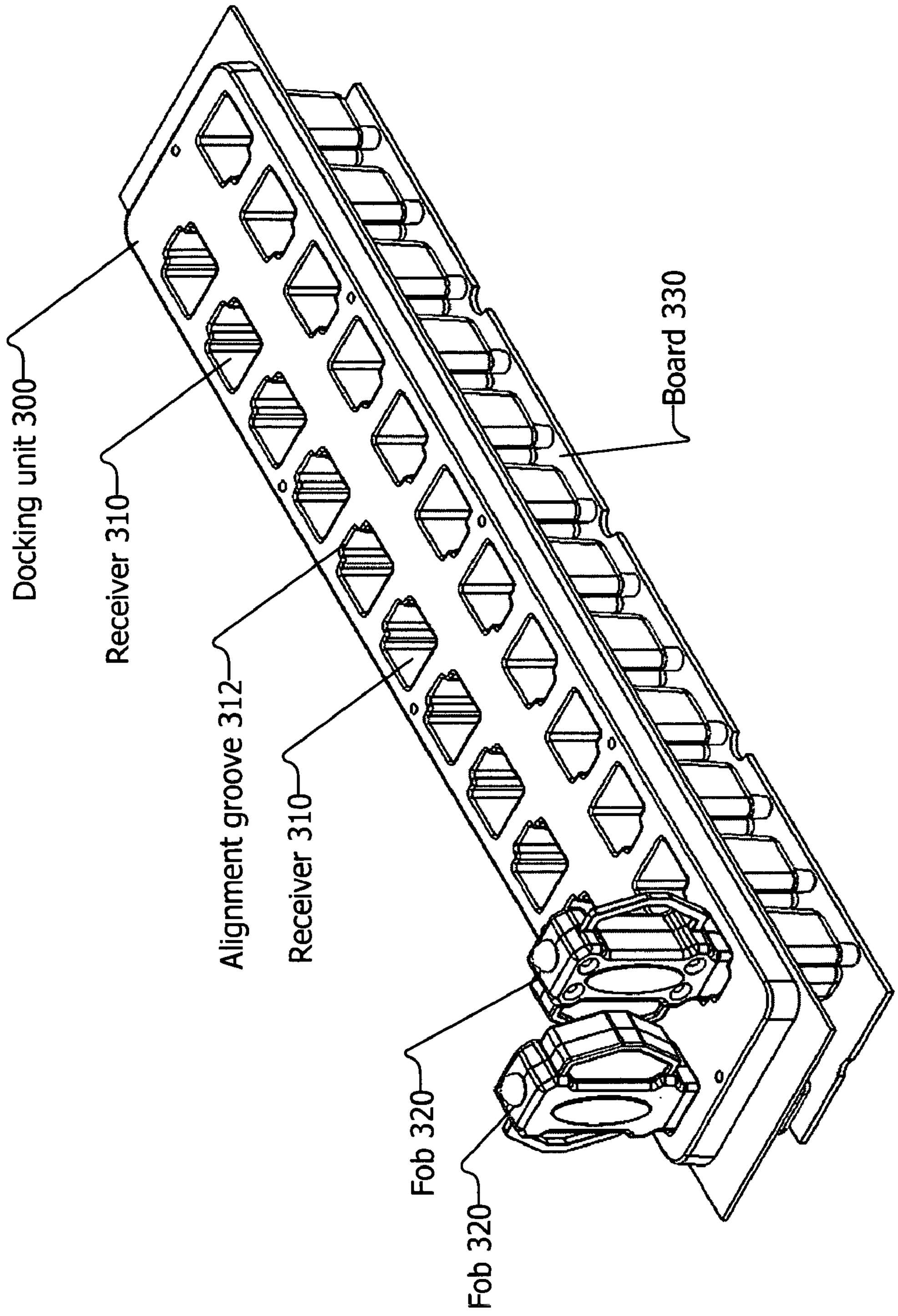
FIG. 3A is a block diagram of a top perspective view of a docking unit included in a key access system described herein.
Figure 3B:
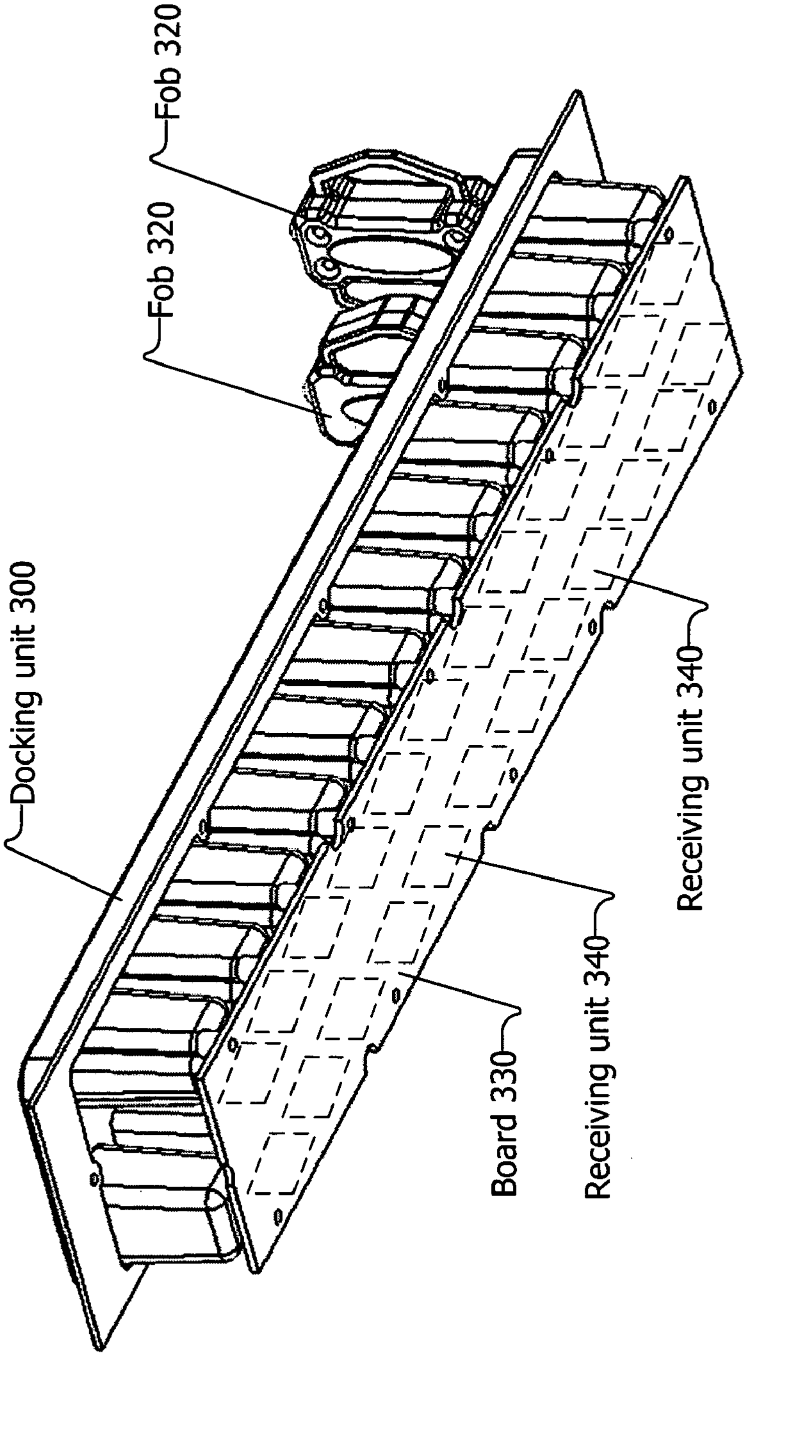
FIG. 3B is a block diagram of a bottom perspective view of a docking unit included in a key access system described herein.

FIG. 3A is a block diagram of a top perspective view of docking unit 300 that may be included in a drawer of a cabinet included in a key access system. FIG. 3B is a block diagram of a bottom perspective view of the docking unit 300. The docking unit 300 may be the docking unit 212 shown in FIG. 2. The docking unit 300 includes multiple receivers 310, each configured to receive a fob 320. In addition, each docking unit has a docking unit controller, such as DUC 230, coupled with the docking unit 300 (not shown in FIGS. 3A and 3B).

Each receiver 310 has an alignment groove 312 which aligns the fob 320 in the receiver 310. The shape of the lower portion of the fob 320 and the receiver 312 are complementary. As can be seen by observing FIG. 4A in comparison with FIG. 3A, the alignment groove 312 corresponds with and aligns the fob 320 by virtue of the fob 320 having a protrusion that fits in the alignment groove 312. Although one alignment groove 312 is shown in receiver 310, a receiver 310 may have two or more alignment grooves; similarly, a fob 320 may have two or more protrusions that correspond with and are coordinated with the alignment grooves in the receiver. In other embodiments, receivers may have a combination of grooves and protrusions that correspond with and are coordinated with protrusions and grooves included on a fob.

In addition to serving to align the fob 320 in the receivers 310, the alignment groove 312 has a magnetic sensor (not shown) to signal when a fob is present in the receiver 310. The magnetic sensor senses a magnet that is included in the protrusion of the fob 320. When a fob 320 is placed in the receiver 310, the magnetic sensor signals the docking unit controller which then queries the fob 320 to obtain a unique identifier from the fob 320. Each fob stores a unique identifier which may be referred to as an electronic serial number (ESN). The unique identifier may be factory set and may not be changed by a key access system user. In other embodiments, the unique identifier may be set by a distributor and/or by a super user, support technician or other highly privileged user of the application software.

The unique identifier of the fob and the receiver location are communicated through the docking unit controller and the cabinet controller to the application software running on the personal computer. Similarly, when a fob 320 is removed from a receiver 310, the magnetic sensor may signal the docking unit controller which then through the cabinet controller notifies the application software on the personal computer that the receiver is vacant.

Because of the use of the magnetic sensor in the receiver 310, the docking unit controller, the cabinet controller, and the application software running on the personal computer do not poll each of the receivers to evaluate whether a fob is present. Whenever a fob 320 is placed into and/or removed from a receiver 310, the application software, receiving unit 340, docking unit controller 230, and/or the cabinet controller 220 take appropriate action upon receiving a signal from the magnetic sensor.

Although the docking unit 300 is shown having a 12×2 array of 24 receivers 310, the number of receivers included in docking unit 300 may be larger and smaller, and may be from 2, 4, 7, 18, 32, 43, 48, 64, and greater. Although shown as a rectangular array or receivers 310, the receivers may be arranged in any shape. For example, the receivers may form a square, a curve, a wave, a parallelogram, and others.

Included with the docking unit and located on its bottom or underside is a board 330. The board 330 may have one docking unit controller and may have as many receiving units 340 as receivers 310. Each receiver 310 of the docking unit 300 has a corresponding receiving unit 340 situated below it on board 330. Each receiving unit 340 is coupled with the docking unit controller.

The length and width of the docking unit 300 may be designed so that the docking unit 300 fits within the drawer 140 of the cabinet 130. The height of the docking unit may be 6", 8" or other height that conforms to the height of the drawer 140 and provides space for easy attachment and maintenance of the docking unit 300 as well as sufficient space for the board 330 and the docking unit controller 230 on each docking unit 300.

Figure 3C:
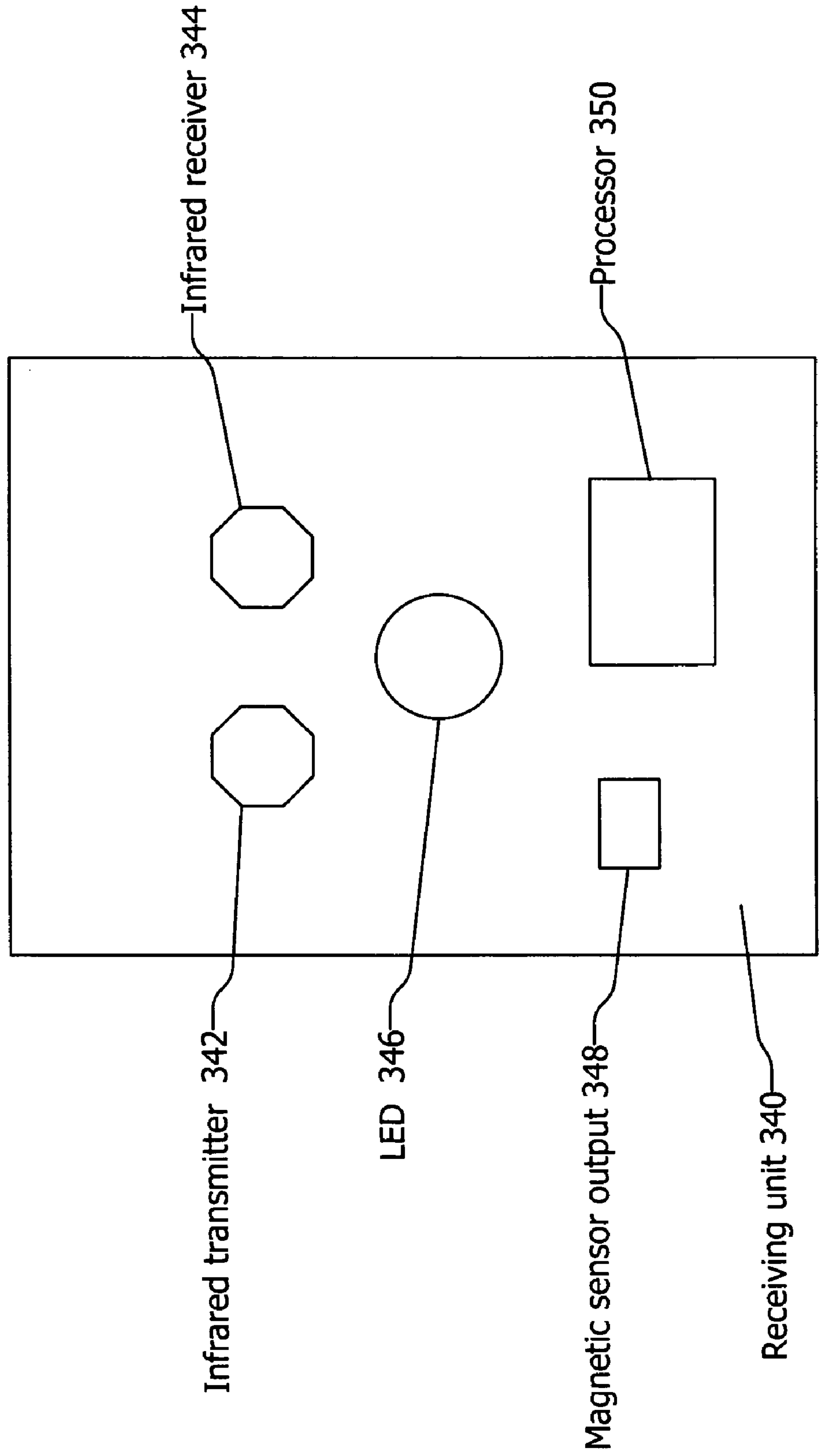
FIG. 3C is a block diagram of a receiving unit included in a docking unit described herein.

FIG. 3C is a block diagram of the components included in the receiving unit 340. Each receiving unit 340 may include an infrared transmitter 342 to send information to the fob 320, an infrared receiver 344 to receive information from the fob, a light emitting diode (LED) 346 or other light source to send light through a light pipe included in the fob 320. The LED 346 may emit red, blue or other visible light. The infrared receiver 344 and the infrared transmitter 342 may be replaced with a single infrared transceiver. The receiving unit 340 may also include a magnetic sensor output 348 coupled with the magnetic sensor located adjacent to the alignment groove 312. In addition, the receiving unit 340 may include a processor 350 coupled with each of the infrared transmitter 342, the infrared receiver 344, the LED 346, and the magnetic sensor output 348. The processor 350 may also be coupled with the docking unit controller included with the docking unit 300. Each receiving unit may be a portion of board 330. In another embodiment, each receiving unit 340 may be a separate circuit board that is coupled with board 330.

Figure 3D:
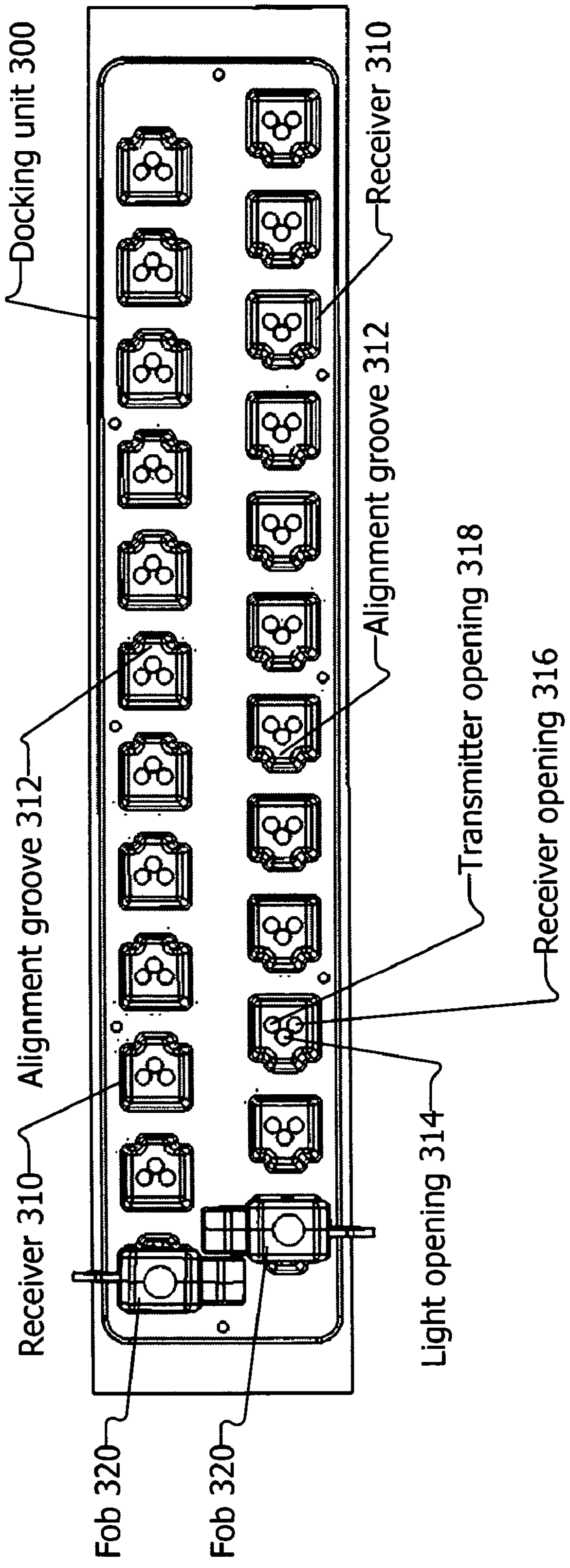
FIG. 3D is a block diagram of a top view of a docking unit included in a key access system described herein.

FIG. 3D is a block diagram of a top view of the docking unit 300. This drawing is provided so that the bottom of each of the receivers 310 may be seen. So that the receiving unit 340 may communicate with and illuminate fobs 320 placed in the receivers 310, each of the receivers 310 have included at their bottom a light opening 314, a receiver opening 316 and a transmitter opening 318. The alignment groove 312 ensures that a fob 320 when placed in the receiver 310 will be in such a position that the infrared transmitter 342 and infrared receiver 344 may send information to and receive information from the fob 320 through transmitter opening 318 and receiver opening 316, and so that the LED 344 or other light source may direct light through the light opening 314 to the light pipe included in the fob 320.

Figure 4A:
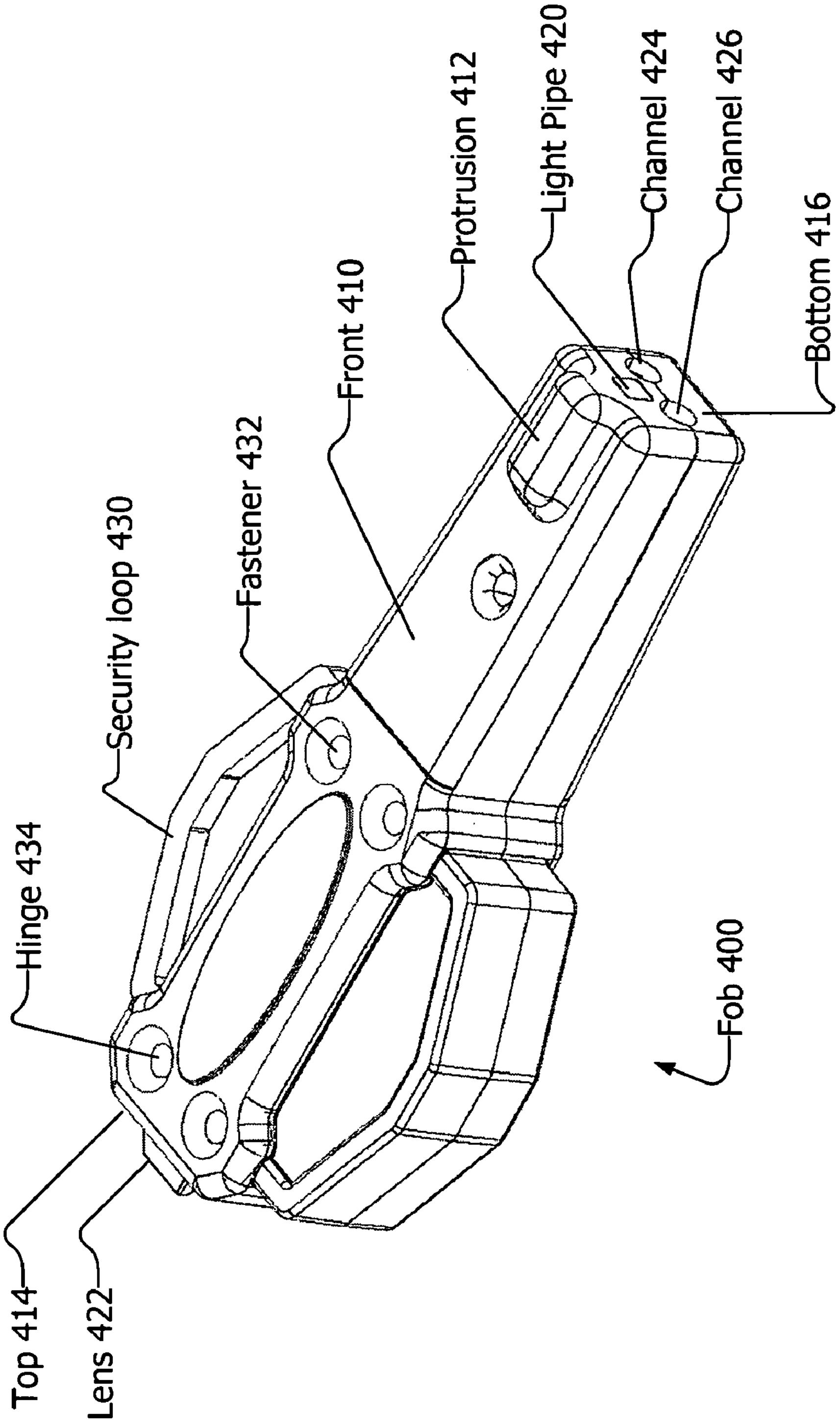
FIG. 4A is a front perspective view of a key fob described herein.
Figure 4B:
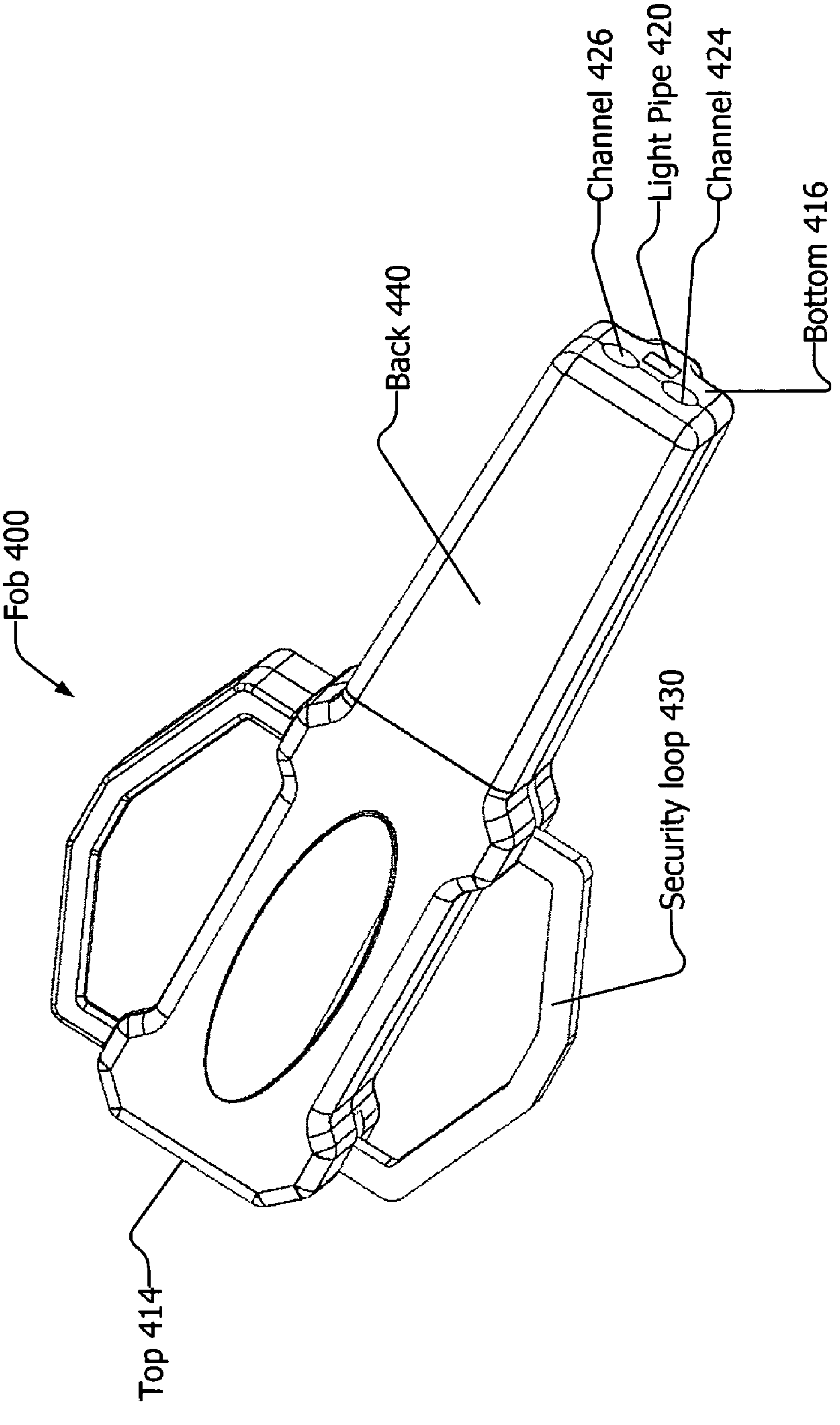
FIG. 4B is a back perspective view of a key fob described herein.
Figure 4C:
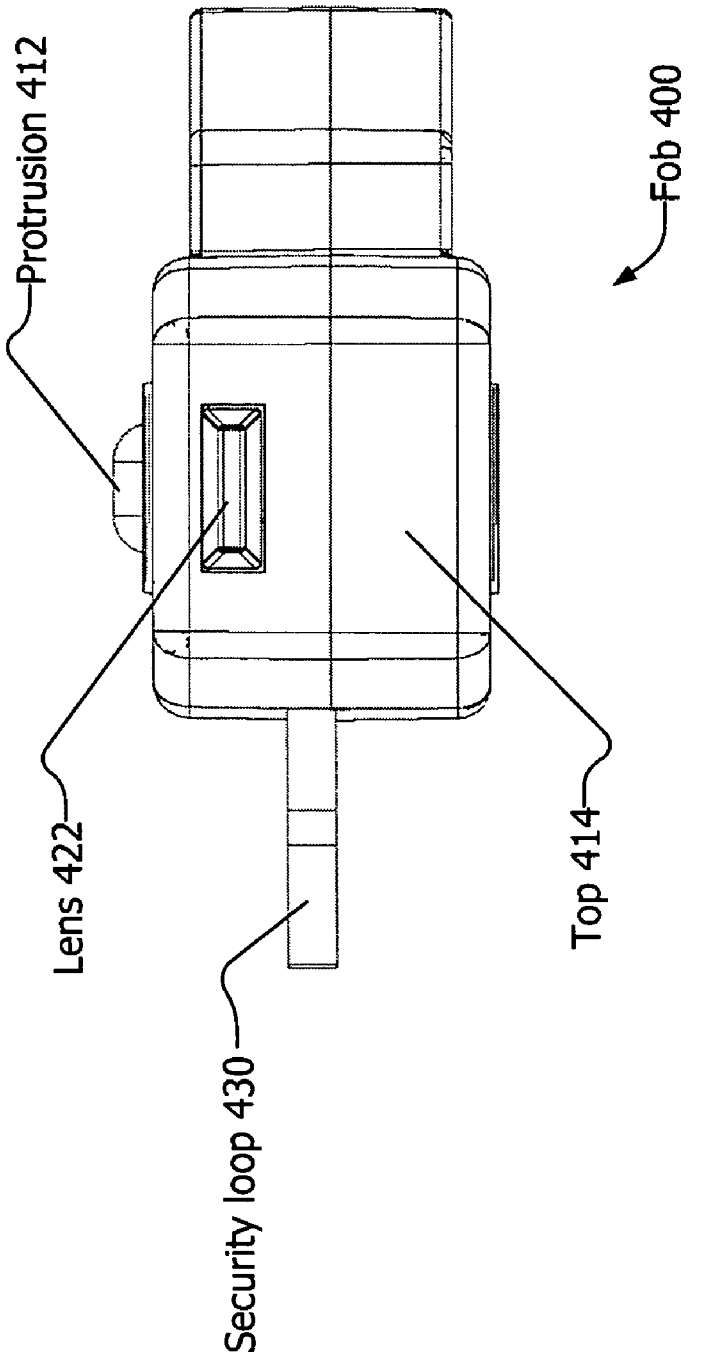
FIG. 4C is a top view of a key fob described herein.
Figure 4D:
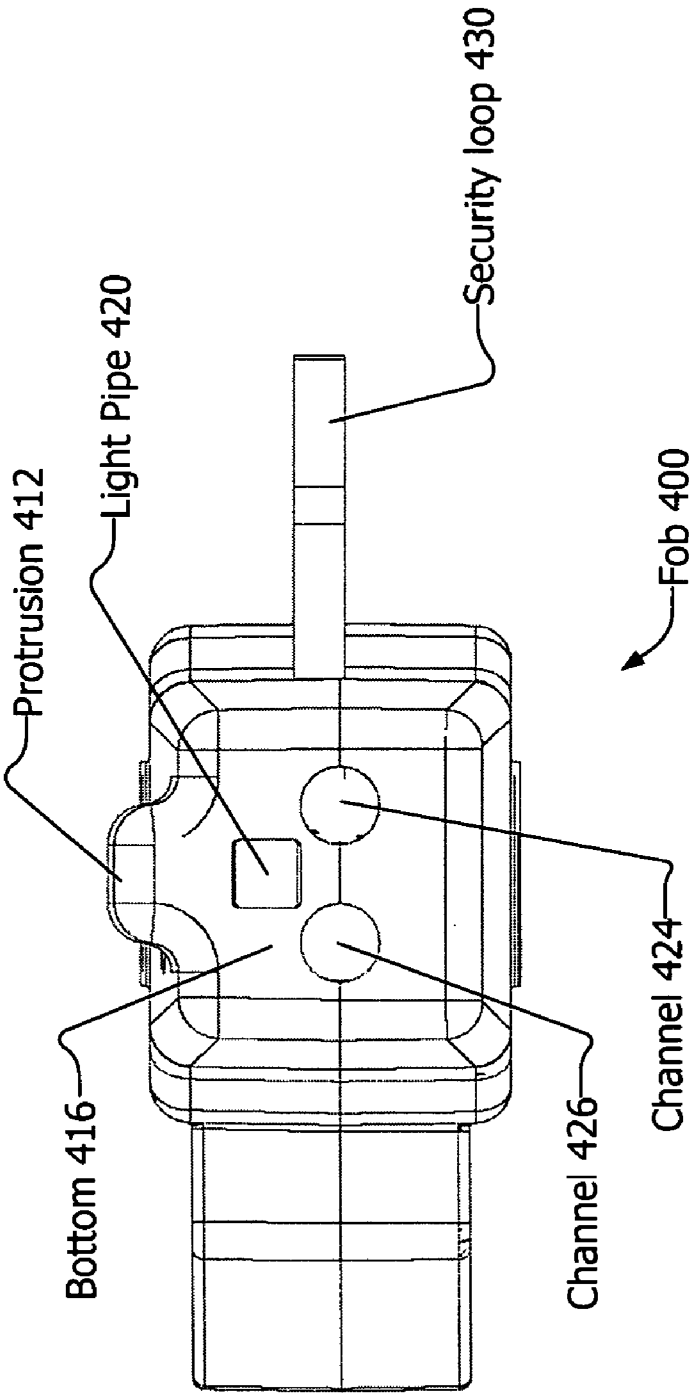
FIG. 4D is a bottom view of a key fob described herein.

FIG. 4A is a front perspective view of a key fob 400, FIG. 4B is a back perspective view of the key fob 400, FIG. 4C is a top view of the key fob 400, and FIG. 4D is a bottom view of the key fob 400. The key fob may be a key fob like fob 320 described above regarding FIGS. 3A, 3B, and 3D. The fob 400 may be shaped generally to replicate a traditional key. The fob may also be other shapes. The fob 400 may be made of plastic, resin, or other similar strong, durable substance. The fob 400 may also be made from or include metals.

The fob 400 is designed to securely hold one or more keys via security loop 430. Security loop 430 may be made of metal, plastic or other strong, resilient material. The security loop 430 may have at one end a hinge 434 so that when fastener 432 is removed, the security loop may pivot or swing out from the fob 400. In this way, keys may be added or removed from the fob 400. The fastener 432 may be a screw, pin or other fastener. Although shown on the front side 410 of the fob 400, the hinge 434 may not be visible to a user, and the fastener 432 may be accessible from the front 410, back 440, or side of the fob 400.

In another embodiment, the security loop 430 may not include a fastener 432 that is accessible to a user, but may include a fastener configured so that the security loop 430 may only be released when the fob 400 is in a receiver and receives a command from a application software on a personal computer included in the key access system instructing the fob 400 to open or release its security loop 430.

In yet another embodiment, the security loop 430 may be permanently attached so that it may not be opened. In this embodiment, a zip tie, key ring, or other device may be used to attach keys to the security loop 430.

The fob 400 includes channels 424 and 426 through which infrared communications are sent to and received from an infrared receiver and an infrared transmitter in a receiving unit in a docking unit. The channels 424 and 426 are hollow openings within the fob 400. The channels 424 and 426 may run from the bottom 416 of the fob 400 through the lower portion of the fob 400 to an infrared receiver and an infrared transmitter included internally in the fob 400. The infrared receiver and the infrared transmitter may not be visible to users of the fob 400. The infrared receiver and the infrared transmitter may be replaced with a single infrared transceiver, such that only a single channel may be included in fob 400.

A light pipe 420 is included in the fob. At the bottom 416 of the fob 400, the light pipe 420 may receive light from an LED or other light source included in a receiving unit in the docking unit. The light pipe 420 runs from the bottom 416 of the fob 400 through the entire length of the fob to lens 422 at the top 414 of the fob 400. Lens 422 helps to disperse light in the light pipe 420 so that it is visible to persons using the key access system. The lens 422 may be any shape, and may be rectangular, circular, flat, domed, a partial prism, and others. The lens 422 may be clear, or may be a colored plastic or other transparent or translucent material.

The fob 400 may have a printed circuit board internally on which an infrared receiver and an infrared transmitter are coupled. The infrared transmitter and receiver in the fob 400 communicates with a corresponding infrared transmitter and receiver in the receiving unit in the docking unit through channels 424 and 426 in the fob 400.

Also included on the printed circuit board included in the fob 400 may be a battery and a processor that includes at least one storage device. The processor included on the printed circuit board in the fob 400 may include flash memory to store instructions to be executed and a unique fob identifier or ESN; RAM; and EEPROM to store two pieces of information concerning the security loop 430. In other embodiments, this information may be stored in one or more other storage devices included on the processor and/or other storage units on the printed circuit board adjacent to and accessible to the processor.

When the security loop 430 is metal, the EEPROM or other storage device may store information about whether the fob 400 should detect whether the security loop 430 has been opened or cut while the fob was out of the cabinet. The closed metal security loop 430 closes a circuit which when opened or cut is broken. The printed circuit board and the processor on the circuit board included in the fob 400 set a bit or otherwise store information in a storage device such as an EEPROM that the security loop 430 was opened while the fob was outside the cabinet.

In one embodiment, the fob 400 is also capable of turning the security loop open detection feature on or off via the application software in the personal computer. That is, when initializing or updating information concerning the fob, or all fobs, the application software may allow a user to specify that key removal detection should not be monitored or reported. This may be achieved by setting a bit or other data in a memory location in a storage device, such as the EEPROM, on the printed circuit board or in the processor on the printed circuit board in the fob. Instructions to achieve this may be sent to the fob by the application software via infrared communications described herein.

The lower portion of the front of the fob 400 includes a protrusion 412 within which a magnet is located. The protrusion 412 may be designed in coordination with the alignment groove included in receivers in docking units discussed above regarding FIGS. 3A, 3B, and 3D. Although shown as a generally rectangular shape with rounded edges, protrusion 412 may be round, square, triangular or other shape designed in coordination with receivers in docking units so that the protrusion in the fob matches or mates with the shape of the alignment groove in the receiver. In another embodiment, the fob may have a male component while the receiver has a coordinated female component. In yet another embodiment, the protrusion may include or be a spring latch or other locking and releasable device that is coordinated with an alignment groove that includes a ledge or similar coordinated surface in a receiver in a docking unit. Such a latch may have a push button or other release device that may be physically accessed by a user.

The magnet included in the fob 400 is separate from and is not in contact with or communication with the circuit board included in the fob 400, and is not in contact with or in communication with the light pipe 420 and the channels 424 and 426 within the fob 400. The magnet is internal to the protrusion 412 and may be sensed by a sensor included internal to and adjacent to the alignment groove included in the receiver in the docking unit. In other embodiments, in place of or in addition to the magnet and magnetic sensor described herein, other proximity sensors, presence sensors, and others may be used to determine the presence of a fob 400 in a receiver.

Figure 5A:
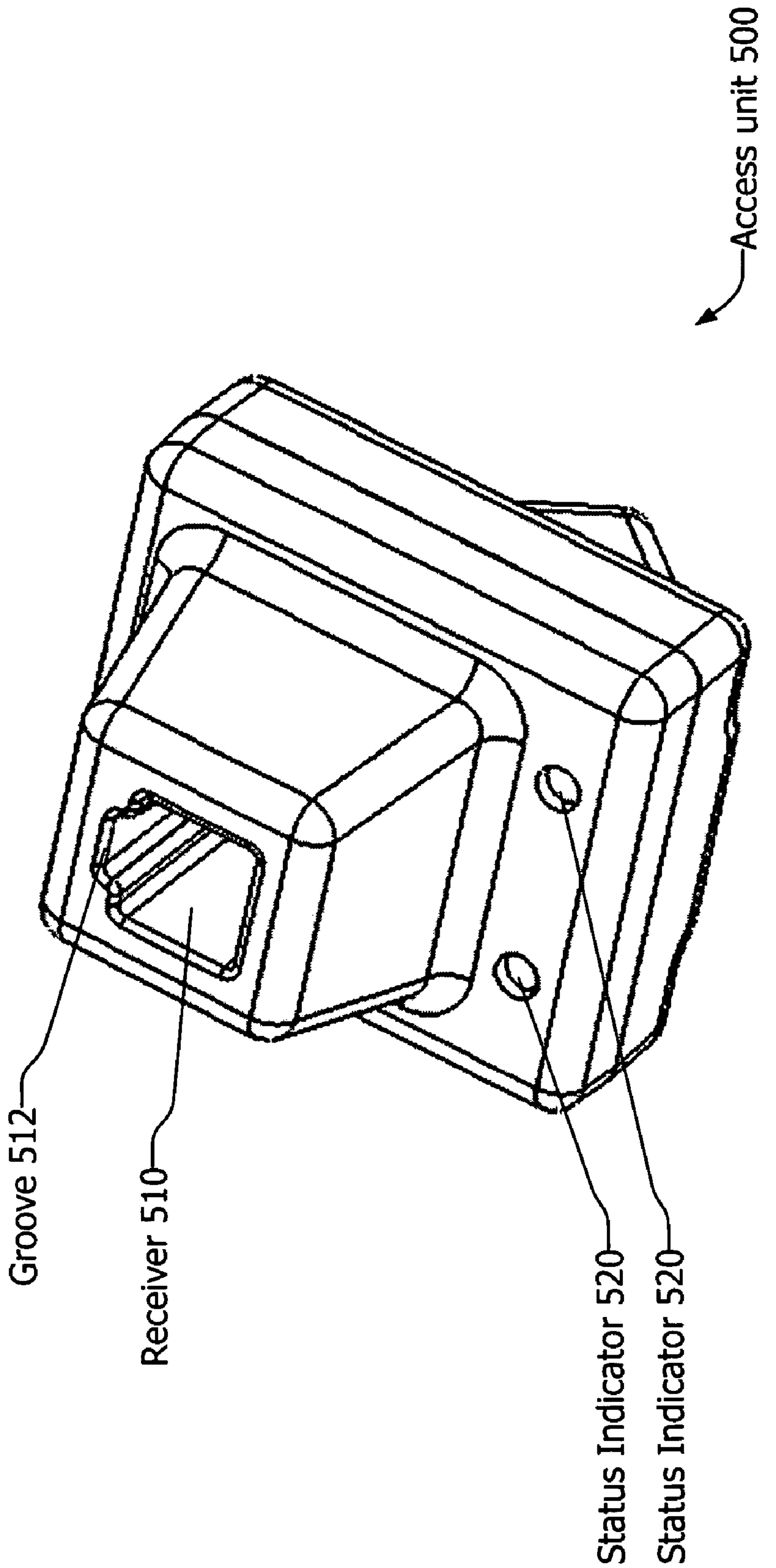
FIG. 5A is a diagram of an access unit described herein.
Figure 5B:
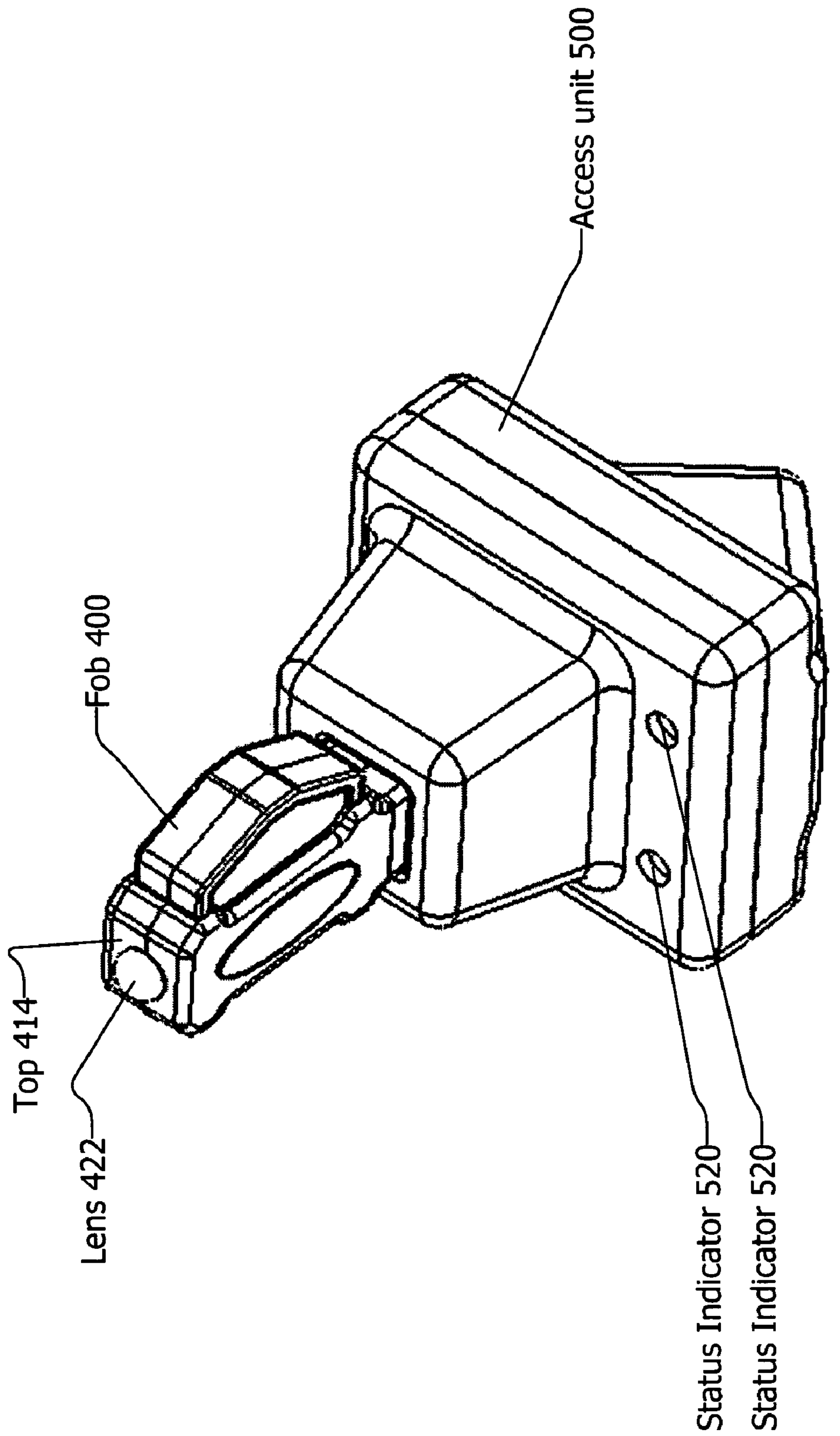
FIG. 5B is a diagram of an access unit with a key fob inserted therein as described herein.

FIG. 5A is a diagram of an access unit 500, and FIG. 5B is a diagram of an access unit with a key fob inserted therein. The access unit 500 may include a receiver 510 to receive a lower portion of a fob, and an alignment groove 512 to properly align a fob in the receiver 510. The receiver 510 may be similar to or the same as receiver 310 discussed above regarding FIGS. 3A, 3B and 3D. That is, the access unit 500 has an LED or other light source to illuminate the fob 400, and an infrared receiver and an infrared transmitter to communicate with the fob 400. The alignment groove 512 of receiver 510 also has a magnet included therein and adjacent thereto to detect the presence of a fob in the access unit 500.

The access unit 500 may include one or more status indicators 520. The status indicators 520 may be light sources such as, for example, LEDs, sound emitters, or a combination of these. The status indicators 520 may notify a user that the access unit 500 is receiving power and is occupied with a fob. The status indicators 520 may be used to alert the user whether access to a key storage cabinet has been approved, such as via a green light, or denied, such as via a red light. Similarly, musical or other sound and/or audible instructions may be provided via sound emitters. In addition, a sound emitter may be used to issue an audible alert capable of being heard by persons in adjacent rooms or in a relatively close proximity when an unauthorized access attempt is made and/or when multiple unsuccessful authorization attempts have been made.

The cabinet controller 220, the docking unit controller 230, and the board 330 may include hardware, software, firmware, or a combination thereof. Additional and fewer units, modules or other arrangement of software, hardware, connectors, firmware and other components may be used to achieve the system described herein.

The cabinet controller 220, the docking unit controller 230, and the board 330 may therefore include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs); and may include various specialized units, circuits, software and interfaces for providing the functionality and features described herein. The invention may be embodied in part in software which operates on the personal computer 110 and may be in the form of firmware, an application program, an applet (e.g., a Java applet), a browser plug-in, a COM object, a dynamic linked library (DLL), a script, one or more subroutines, an operating system component or service, or a combination of these and other software components. The hardware and software of the invention and its functions may be distributed such that some components are performed by the personal computer 110 and others by the cabinet controller 220, the docking unit controller 230, and the receiving units 340.

A Method

Figure 6:
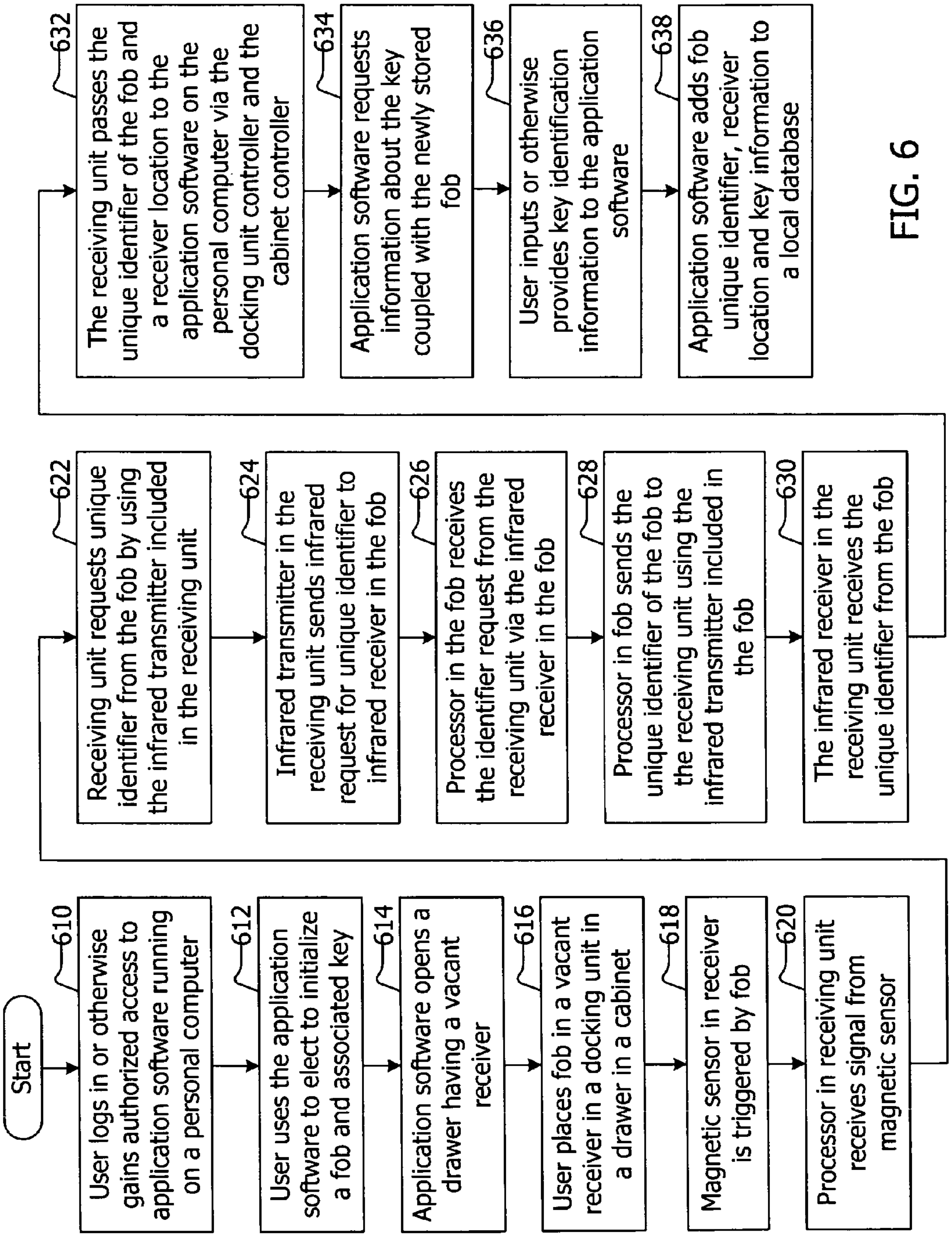
FIG. 6 is flowchart of the actions taken by a key access system when initializing a fob having an attached key.

FIG. 6 is flowchart of the actions taken by a key access system when initializing a fob having an attached key. The key access system may be that described above regarding FIG. 1, and the fob may be the fob described above regarding FIGS. 4A–4D.

A user logs in or otherwise gains authorized access to application software running on a personal computer included in the key access system, as shown in block 610. In addition to providing a password, an identification or access card may be swiped, a thumb print may provided, and/or other biometric authorization may be required. The user may then use the application software to elect to initialize a fob and an associated key, as shown in block 612. The application software may automatically open or unlock a drawer having a vacant receiver, as shown in block 614. Alternatively, the application software may allow a user to request that a drawer having an empty receiver be opened.

The user may place a fob in a receiver in docking unit in a drawer in a cabinet, as shown in block 616. The docking unit may be docking unit 300 described above with regard to FIGS. 3A, 3B and 3D.

When the fob is placed in the receiver, a magnetic sensor in the receiver is triggered by the fob, as shown in block 618. A processor in a receiving unit associated with the receiver receives a signal from magnetic sensor alerting the receiving unit to the presence of the fob, as shown in block 620. In response to receiving the fob present signal from the magnetic sensor, the receiving unit requests a unique identifier from the fob by using the infrared transmitter included in the receiving unit, as shown in block 622. The infrared transmitter in the receiving unit sends an infrared request for the unique identifier to the infrared receiver located in the fob, as shown in block 624.

The processor in the fob receives the identifier request from the receiving unit via the infrared receiver in the fob, as shown in block 626. The processor in the fob sends the unique identifier of the fob to the receiving unit using the infrared transmitter included in the fob, as shown in block 628. The infrared receiver in the receiving unit receives the unique identifier from the fob, as shown in block 630. The receiving unit passes the unique identifier of the fob and a receiver location to the application software on the personal computer via the docking unit controller and the cabinet controller, as shown in block 632.

On the personal computer, via its user interface, the application software requests information about the key that is coupled with the newly stored fob, as shown in block 634.

The user inputs or otherwise provides key identification information to the application software, as shown in block 636. The key identification information may be hand entered by a user, may be scanned in off a tag associated with the keys, or may be retrieved from a local or remote database based on a key identification number, vehicle identification number, stock number or other identifier on a tag associated on the key or otherwise associated with the key. The identification information may include make, model, year, color, and/or pertinent features of a vehicle associated with the key. The identification information may include the location of a vehicle associated with the key.

At this time, or at a later time, the application software may allow a super user, manager or other person to define classes or groups of persons who may be allowed access to the key associated with the fob.

The application software may add the fob unique identifier, receiver location and key information to a local database, as shown in block 638. The local database may be part of the application software or may be another software application, plug-in or the like. In another embodiment, the local database may be augmented by or replaced by a remote database accessible over a network. The database may be relational, SQL, Paradox, or other proprietary or well known database.

The actions taken in the discussion regarding FIG. 6 refer to placing the fob in a receiver in a docking unit in a drawer for initialization. In another embodiment, the fob may be placed in an access unit such as access unit 500 shown in FIGS. 5A and 5B. In this embodiment, the actions of to the receiver and receiving unit and their components are performed by an access unit such as access unit 500, a difference being that the location of the receiver is neither passed to nor stored by the application software. In this embodiment, after the key/fob association is made via the access unit, the fob may be placed in a receiver of a docking unit in a drawer in the cabinet, and the actions taken in steps 616–632, and 630 may be performed.

Figure 7:
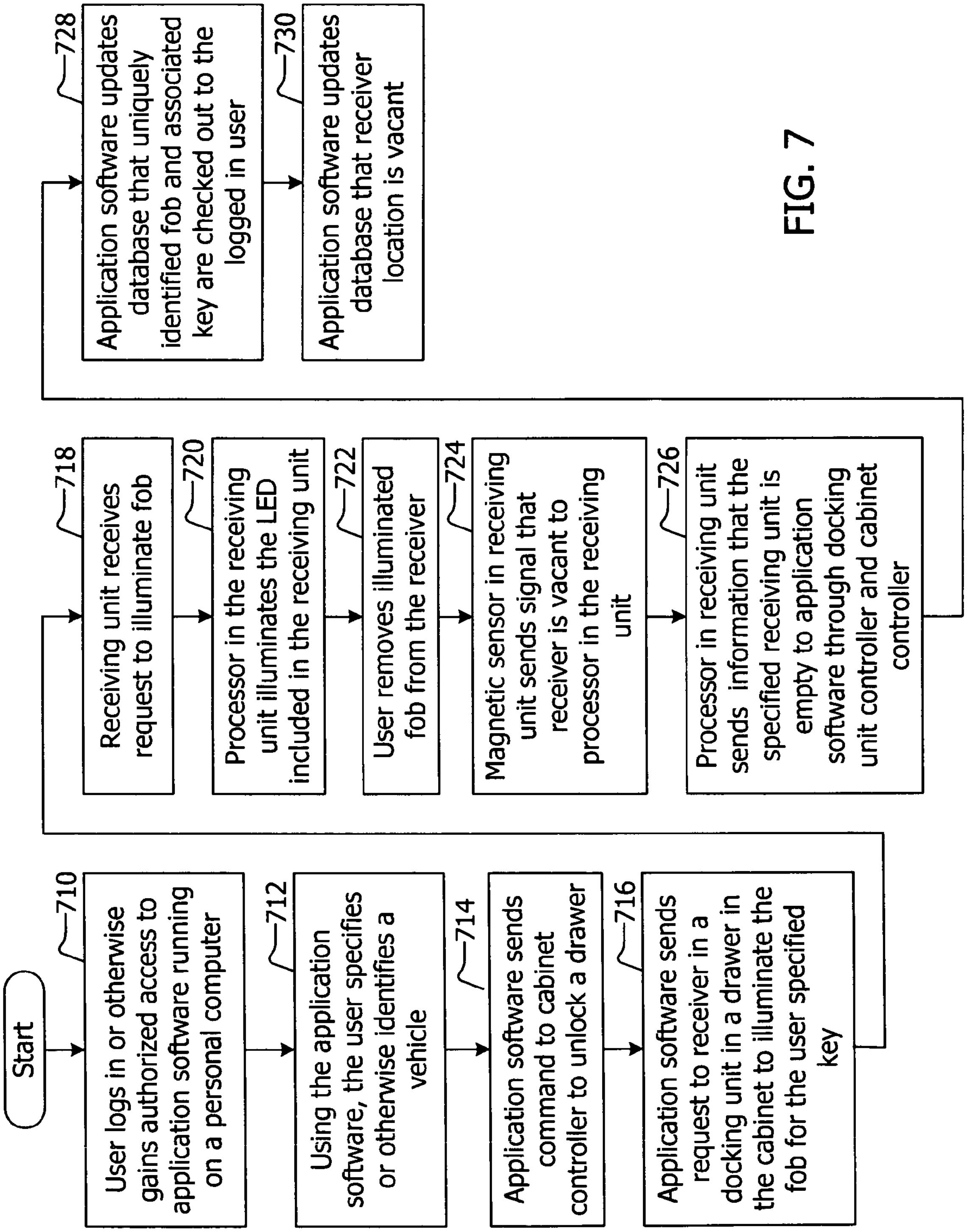
FIG. 7 is flowchart of the actions taken by a key access system when removing a fob having an attached key.

FIG. 7 is flowchart of the actions taken by a key access system when removing a fob having an attached key. After a fob with a key is placed in the key access system it may be removed to access the vehicle, equipment, or property with which the key associated.

A user logs in or otherwise gains authorized access to application software running on a personal computer, as shown in block 710. Using the application software, the user specifies or otherwise identifies a vehicle the user wishes to access, as shown in block 712. In other embodiments, the user may select a boat, equipment, a property location, a room location, and others.

The application software may sends a command to the cabinet controller to unlock a drawer in which the fob is located, as shown in block 714. The application software may access the local database to obtain the location of the fob in the cabinet. The Application software may send a request to a receiver in a docking unit in a drawer in the cabinet to illuminate the fob for the user specified key, as shown in block 716. Again, the application software may access the local database to obtain the location of the fob in the cabinet.

The receiving unit receives the application software request to illuminate the fob, as shown in block 718. The processor in the receiving unit illuminates the LED included in the receiving unit, as shown in block 720. This causes light to be emitted through the light pipe in the fob and dispersed through the lens in the fob. In this way, the user may easily locate a desired fob in a drawer of multiple fobs.

The user removes the illuminated fob from the receiver, as shown in block 722. The magnetic sensor in the receiving unit sends a signal that the receiver is vacant to the processor in the receiving unit, as shown in block 724. The processor in the receiving unit sends information that the specified receiving unit is empty to the application software through the docking unit controller and the cabinet controller, as shown in block 726. The application software updates its database with information that the fob having the unique identifier and its associated key are checked out to the logged in user, as shown in block 728. This update is based on looking up the receiving unit in the database.

The application software may update the database that the receiver location is vacant, as shown in block 730.

Although the actions described above regarding FIG. 7 refer to the receiving unit, in other embodiments, some or all of the processing and actions performed by the receiving unit may be performed by the docking unit controller and/or the cabinet controller.

Figure 8:
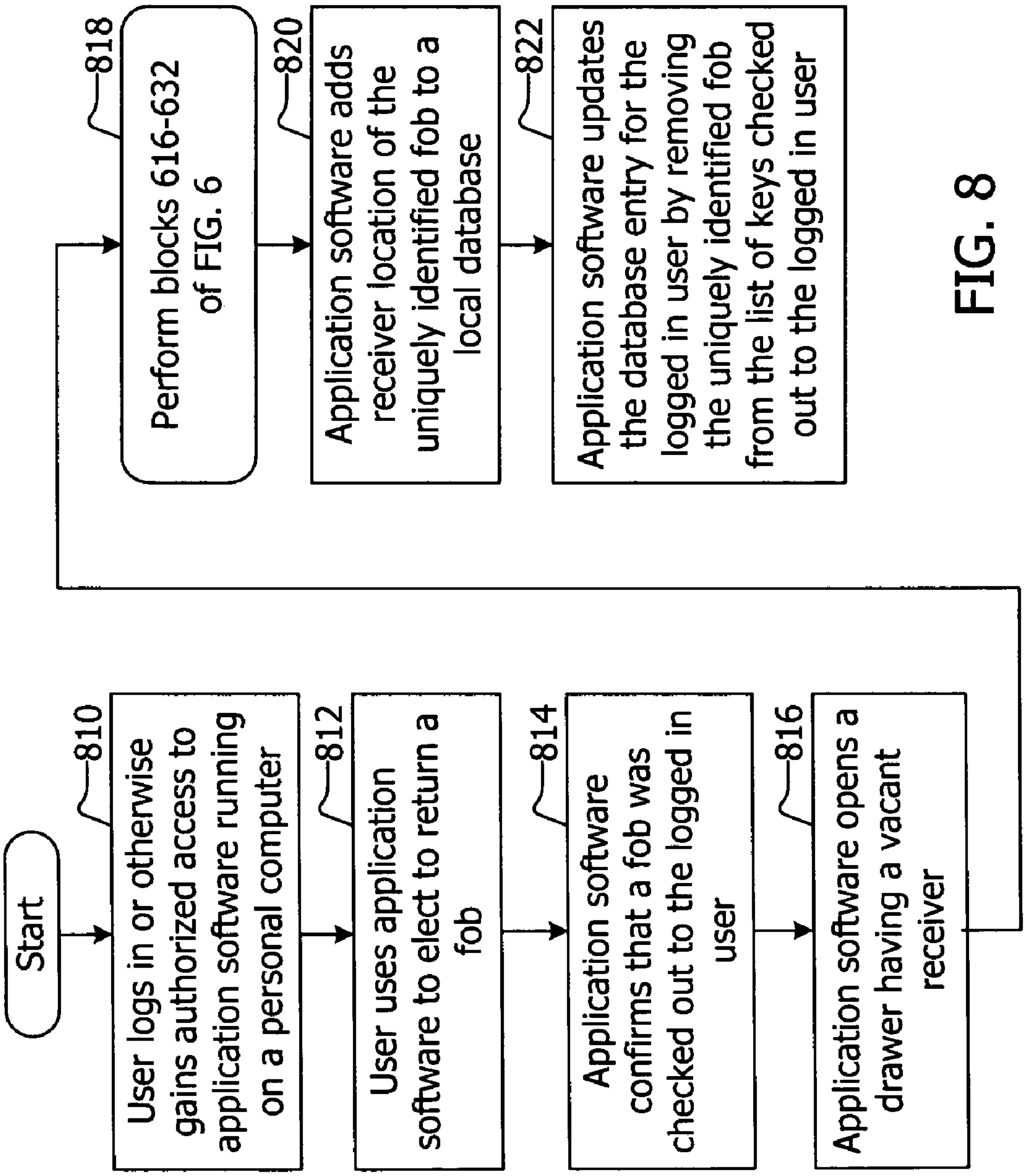
FIG. 8 is flowchart of the actions taken by a key access system when replacing a fob having an attached key.

FIG. 8 is flowchart of the actions taken by a key access system when replacing a fob having an attached key. After a user has driven the vehicle associated with the key, performed maintenance on the vehicle with the key or is otherwise finished with the vehicle, the fob is returned to the key access system. In other embodiments, when the user has completed accessing the boat, equipment, property, room, the key is returned in a similar manner.

The user logs in or otherwise gains authorized access to the application software running on the personal computer, as shown in block 810. In one embodiment, the fob may be used in conjunction with or in place of logging in to gain access to the cabinet by placing the fob into an access unit coupled to the personal computer.

The user may use the application software to elect to return a checked out fob, as shown in block 812. The application software may confirm that a fob was checked out to the logged in user, as shown in block 814. The application software opens a drawer having a vacant receiver, as shown in block 816.

The user places the fob in a vacant receiver, and the actions listed in blocks 616–632 of FIG. 6 are performed, as shown in block 818.

In addition, the receiving unit may receive and pass information from the fob that the security loop was opened while the fob was checked out. In this way, the application software may be alerted that the key attached to the fob was removed while the fob was checked out.

The application software then adds the receiver location of the uniquely identified fob to its local database, as shown in block 820. As discussed above, a remote database may be used in place of or to augment the local database. The application software may update the database entry for the logged in user by removing the uniquely identified fob and associated key from the list of fobs/keys checked out to the logged in user, as shown in block 822. The drawer may then automatically dose, or the user may close the drawer.

As set forth in FIGS. 6, 7 and 8, the application software may maintain information concerning the fob and keys attached to the fob as well as information about the persons accessing the fobs and keys attached thereto. The application software may also maintain logs or be capable of preparing reports showing the history of access to the fobs and keys attached thereto as well as the history of persons accessing the fobs and keys attached thereto.

With regard to FIGS. 6, 7 and 8, additional and fewer steps may be taken, and the steps as shown may be combined or further refined to achieve the methods described herein.

Although exemplary embodiments of the present invention have been shown and described, it will be apparent to those having ordinary skill in the art that a number of changes, modifications, or alterations to the invention as described herein may be made, none of which depart from the spirit of the invention. All such changes, modifications and alterations should therefore be seen as within the scope of the invention.

What is claimed is:

1. A fob to hold a key and to be used in a key access system, the fob comprising:

a housing having a top end and a bottom end;

a receiver to receive information, said receiver mounted in said housing;

a transmitter to send a unique identifier said transmitter mounted in said housing; and a light pipe running from the bottom end of the housing to the top end of the housing to receive light at the bottom end of the housing and to emit light at the top end of the housing.

2. The fob of claim 1 wherein:

the transmitter comprises an infrared transmitter;

the receiver comprises an infrared receiver.

3. The fob of claim 1 further comprising:

a security loop through which one or more keys may be attached.

4. The fob of claim 3 wherein the security loop is metal and the external portions of the fob are plastic.

5. The fob of claim 4 further comprising:

a closed circuit formed by said security loop; and a processor to write to a storage device when the circuit is broken.

6. The fob of claim 1 further comprising:

a lens at the top end of the fob appurtenant to the light pipe through which light from the light pipe is dispersed.

7. The fob of claim 1 further comprising:

a magnet located internal to the fob and located at a lower portion of the fob.

8. The fob of claim 1 further comprising:

a protrusion to align the fob within a receiver, the protrusion located at a lower portion of the fob.

9. The fob of claim 8 further comprising:

a magnet located internal to the fob and within the protrusion.

10. A fob to hold a key and to be used in a key access systems, the fob comprising:

a housing;

an infrared transceiver to receive information and to send a unique identifier, said transceiver mounted in said housing;

a light pipe running from a bottom end of the housing to a top end of the housing to receive light and to emit light at the top end of the housing;

a protrusion on said housing to align the fob within a receiver, the protrusion located at a lower portion of the housing;

a magnet located internal to the housing; and a security loop extending from said housing through which one or more keys may be attached.

11. The fob of claim 10 wherein the security loop is metal and the external portions of the fob are plastic.

12. The fob of claim 11 further comprising:

a closed circuit formed by said security loop; and a processor to write to a storage device when the circuit is broken.

13. A fob to hold a key and to be used in a key access system, the fob comprising:

a housing;

an infrared receiver to receive information, said receiver mounted in said housing;

an infrared transmitter to send a unique identifier, said transmitter mounted in said housing;

a light pipe running from a bottom end of the housing to a top end of the housing to receive light and to emit light at the top end of the housing;

a protrusion on said housing to align the housing within a receiver, the protrusion located at a lower portion of the housing;

a magnet located internal to the housing and within the protrusion; and a security loop on said housing through which one or more keys may be attached.

14. A docking unit comprising:

a plurality of elongated receivers, each receiver having a first end and a second end and configured to receive a fob, each receiver having an opening at the first end and including an alignment groove, each receiver further including at the second end a receiver opening, a transmitter opening, and a light opening;

a board positioned below the second end of the plurality of receivers, said board including a plurality of receiving units, one receiving unit positioned below each receiver on said board, each receiving unit including a transmitter, a receiver, a light source, and a first processor;

a controller coupled to each of the receiving units, the controller including a second processor.

15. The docking unit of claim 14 wherein the transmitter comprises an infrared transmitter; and the receiver comprises an infrared receiver.

16. The docking unit of claim 14 wherein the light source comprises a light emitting diode (LED).

17. The docking unit of claim 14 wherein the controller is coupled for communication with a computing device through a cabinet controller.

18. The docking unit of claim 14 wherein the computing device comprises a personal computer.

19. The docking unit of claim 14 further comprising:

a magnetic sensor included in each of receivers, the magnetic sensors located adjacent to the alignment grooves and coupled to the first processors, the magnetic sensor to signal when the receiver is populated with a fob.

20. A docking unit comprising:

a plurality of receivers, each receiver having a first end and a second end and configured to receive a fob at said first end, each receiver including at the second end a receiver opening, a transmitter opening, a light opening, said receiver further including an alignment groove, and a magnetic sensor, the magnetic sensor located adjacent to the alignment groove and coupled to a first processor, the magnetic sensor to signal when a fob is in the receiver; and a board positioned below the second end of the plurality of receivers, said board including a plurality of receiving units, a receiving unit positioned on the board below each receiver, each receiving unit including an infrared transmitter, an infrared receiver, a light emitting diode (LED), and the first processor a controller coupled to each of the receiving units, the controller including a second processor.

21. A docking unit comprising:

a plurality of receivers, having a first end and a second end and configured to receive a fob at said first end, each receiver including at the second end a transceiver opening, a light opening, said receiver further including an alignment groove, and a magnetic sensor, the magnetic sensor located adjacent to the alignment groove and coupled to a first processor, the magnetic sensor to signal when a fob is in the receiver;

a board positioned below the second end of the plurality of receivers, said board including a plurality of receiving units, wherein a receiving unit is positioned on said board below a receiver, said receiving units each including an infrared transceiver, a light emitting diode (LED), and the first processor; and a controller coupled to each of the receiving units, the controller including a second processor.

22. A drawer to store a plurality of keys comprising:

one or more docking units, each docking unit comprising a plurality of receivers having a first end and a second end and configured to receive one of a plurality of fobs at said first end, each fob having one or more keys attached thereto;

a board positioned below the second end of the plurality of receivers, said board including a plurality of receiving units, each receiving units configured to be positioned on said board below a receiver, each receiving unit including a transmitter, a receiver, a light source, and a processor; and a controller coupled with each of the receiving units.

23. The drawer of claim 22 wherein:

the transmitter comprises an infrared; and the receiver comprises an infrared receiver.

24. The drawer of claim 22 wherein the tight source comprises a light emitting diode (LED).

25. The drawer of claim 22 further comprising a cabinet controller coupled with each of the controllers of the docking units, the cabinet controller to communicate with a computing device.

26. The drawer of claim 25 wherein the comporting device comprises a personal computer.

27. The drawer of claim 22 wherein each receiver comprises a magnetic sensor located adjacent to an alignment groove included in each receiver, the magnetic sensor to signal when the receiver is populated with one of the fobs.

28. A system comprising:

a computing device to run an application program;

a cabinet coupled to the computing device, the cabinet including at least one drawer, the drawer including at least one docking unit, the docking unit comprising:

a plurality of receivers having a first end and a second end and each receiver configured to receive at the first end a fob, each receiver including an alignment groove, and at the second end, a receiver opening, a transmitter opening, and a light; a board positioned below the second end of the plurality of receivers, said board including a plurality of receiving units, wherein a receiving unit is positioned on said board below a receiver, each receiving unit including a transmitter, a receiver, a light source, and a first processor; and a controller coupled to each of the receiving units, the controller including a second processor.

29. The system of claim 28 wherein the transmitter comprises an infrared transmitter; and the receiver comprises an infrared receiver.

30. The system of claim 28 wherein the light source comprises a light emitting diode(LED).

31. The system of claim 28 wherein the cabinet further comprises a cabinet controller such that the controller is coupled for communication with the computing device through the cabinet controller.

32. The system of claim 28 wherein the computing device comprises a personal computer.

33. The system of claim 28 wherein each of the receivers includes a magnetic sensor, the magnetic sensor located adjacent to the alignment grooves and coupled to the first processor, the magnetic sensor to signal when the receiver is populated with a fob.

34. The system of claim 28 further comprising:

an access unit coupled to the computing device.

35. The system of claim 34 wherein the access unit is one or more selected from the group of a biometric device, a card reader, and a fob access unit.

36. A method comprising:

receiving a notification that a fob is in a receiver in a docking unit in a drawer in a cabinet, the notification triggered by a signal from a magnetic sensor included with the receiver requesting a unique identifier from the fob via infrared communications with the fob forwarding the unique identifier and a receiver location to an application program running on a computing device;

requesting information about an item associated with a key attached to the fob, the requesting achieved via a user interface on the computing device;

receiving item description information from the user;

storing the unique identifier, the receiver location and the item description information in a database;

receiving a request to access the key;

determining the receiver location of the fob to which the key is attached by accessing the database;

instructing the cabinet to open the drawer in which the key is located;

instructing the receiver to illuminate its light emitting diode (LED) to illuminate the fob to which the key is attached; and transmitting light generated from below the fob through the fob utilizing a light pipe disposed therein.

37. The method of claim 36 further comprising:

receiving a notification that the receiver is vacant triggered by a signal from the magnetic sensor; and updating the database reflecting that the fob and the key are checked out.

38. The method of claim 36 wherein the item is one or more of an automobile, a motorcycle, a boat, and a recreational vehicle.

* * * * *